United States Patent Office 3,348,885
Patented Oct. 24, 1967

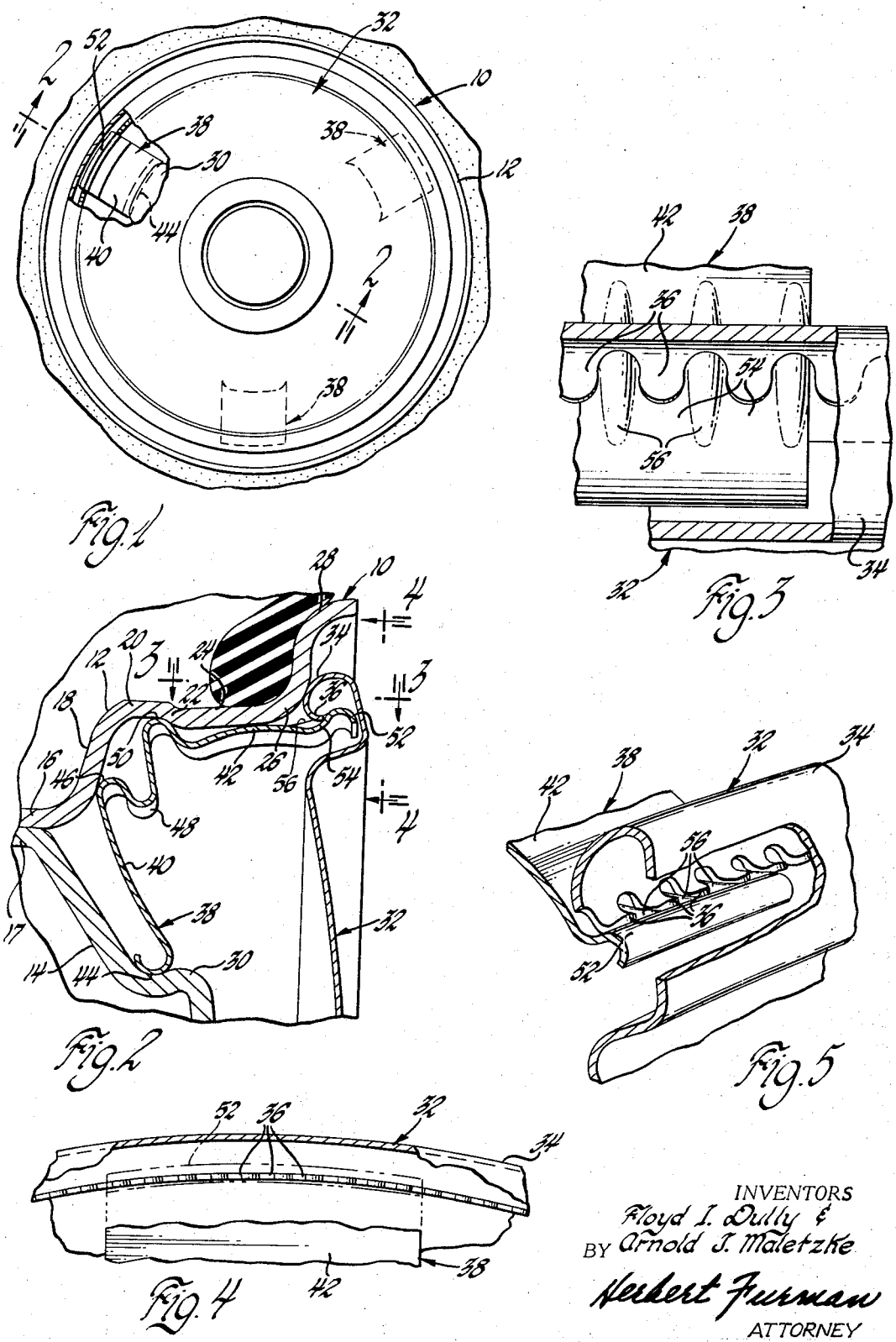

3,348,885
WHEEL COVER
Floyd I. Dully, Detroit, and Arnold J. Maletzke, Rochester, Mich., assignors to General Motors Corporation, Detroit, Mich., a corporation of Delaware
Filed Jan. 28, 1966, Ser. No. 523,712
2 Claims. (Cl. 301—37)

ABSTRACT OF THE DISCLOSURE

A vehicle wheel includes a wheel body and a wheel rim. Three cover mounting members are mounted on the wheel to support a wheel cover. Each member includes a radially compressible body portion and a radially flexible cantilever arm. The free end of the body portion includes a return bent flange which seats on a wheel body shoulder and a fulcrum rib which seats within the bead of the tire rim at the shoulder which joins the bead to the axially extending flange of the rim. The peripheral flange of the wheel cover is reversably bent and provided with teeth which straddle reinforcing ribs on the cantilever arm to hold the cover against turning.

This invention relates to a wheel cover and more particularly to improved means for mounting a wheel cover on a vehicle wheel.

One feature of this invention is that the mounting means include a plurality of mounting members mounted on a vehicle wheel and having resilient cantilever arm portions engageable with the wheel cover to resiliently support and locate the cover on the wheel. Another feature of this invention is that interengaging means are provided between the cantilever arm portions and the wheel cover to prevent relative rotation therebetween. A further feature of this invention is that the mounting members include a resilient body portion engageable with spaced portions of the wheel to mount the mounting members on the wheel. Yet another feature of this invention is that the cantilever portions are fulcrumed on the body portions and extend axially along the wheel rim intermediate flange to adjacent the terminal flange of the wheel rim for engagement with the peripheral bead of the cover.

These and other features of the wheel cover of this invention will be readily apparent from the following specification and drawings wherein:

FIGURE 1 is a partially broken away partial elevational view of a vehicle wheel having a wheel cover according to this invention mounted thereon;

FIGURE 2 is an enlarged sectional view taken generally along the plane indicated by line 2—2 of FIGURE 1;

FIGURE 3 is a view taken generally along the plane indicated by line 3—3 of FIGURE 2;

FIGURE 4 is a broken away view taken generally along the plane indicated by line 4—4 of FIGURE 2; and FIGURE 5 is an enlarged partially broken away perspective view.

As shown in FIGURES 1 and 2 of the drawings, a conventional vehicle wheel designated generally 10 includes a rim 12 and a body 14. The rim 12 includes a base flange 16 suitably joined to the peripheral flange 17 of the body. An intermediate radially outwardly extending and axially outwardly facing flange 18 of the rim merges into the tire bead 20 which projects radially outwardly and opens axially inwardly. The bead 20 is joined by an annular juncture shoulder 22 with the intermediate flange 24 of the rim. Flange 24 merges on an annular juncture shoulder 26 with the terminal lip flange 28 of the rim. The wheel body 14 includes three circumferentially spaced, conventional, radially extending bumps 30 adjacent the central portion thereof.

A wheel cover designated generally 32 is of a size sufficient to cover the major portion of the wheel and includes a radially inwardly opening peripheral bead or flange portion 34. As best shown in FIGURES 3 and 5, the free or terminal edge portion of bead 34 is provided with three groups of circumferentially spaced teeth 36.

The cover 32 is retained on the wheel by three circumferentially spaced retaining means or clips designated generally 38. Since each of the clips is of the same construction, only one will be described in detail.

The clip 38 generally includes a body portion designated 40 and a cantilever arm portion designated 42. The free end of the body portion 40 includes a bead or curl 44 which is shaped to straddle the bump 30, FIGURE 1. The body portion 40 further includes a radially inwardly opening and axially inwardly projecting intermediate bead or rib 46 which resiliently engages the annular flange 18 of the wheel rim. This bead is located axially inwardly of a radially outwardly opening and axially outwardly projecting bead or rib 48 which is joined to a radially outwardly projecting and axially outwardly opening bead or rib 50 which seats on bead 20 and engages the shoulder 22 of the rim. Bead 50 functions as the fulcrum for the cantilever arm portion 42 of the clip.

The cantilever portion 42 of the clip is bowed and normally biased radially outwardly of its position shown in FIGURE 2 so as to resiliently engage the flange 24 adjacent the annular shoulder 26. Portion 42 terminates in a bead 52 and is provided with a plurality of radially outwardly extending recesses 54 separated by ribs or projections 56.

The clip 38 is mounted on the wheel by first seating the bead 44 thereof on the bump 30 of the wheel body and then swinging or forcing the body portion 40 of the clip axially inwardly until the rib 50 seats within the tire bead 20. The rib 46 will normally engage the flange 18 and the bowed portion of the cantilever arm portion 42 will engage the flange 24.

When it is desired to mount the cover on the wheel, the clips 38 are first installed. Then, two of the groups of teeth 36 are engaged within the recesses 54 of two of the clips 38. The cover is then shifted radially of the wheel so that the other group of teeth 36 can be forced over the bead 52 of the other clip and into engagement within the recesses 54 of this other clip. The fulcruming of the cantilever arm portions 42 of the clips will center the cover 32 within the wheel opening, with the peripheral bead 34 of the cover in engagement with the shoulder 26 of the rim. Since each cantilever arm portion 42 is free to swing radially with respect to its fulcrum bead or rib 50, the cover 32 will float on the wheel.

The engagement of the teeth 36 within the recesses 54 provides an anti-turn means preventing relative rotation between the cover and the wheel. Normally more teeth 36 are provided than recesses 54 so that the cover 32 can be rotated relative to the wheel to locate the cover in the desired position or as required, such as by the necessity of aligning the valve stem opening of the cover with the valve stem of the wheel.

Thus, this invention provides an improved wheel cover assembly.

We claim:

1. In combination with a vehicle wheel having a wheel body provided with a radially outwardly facing shoulder and a wheel rim having an intermediate axially outwardly facing flange merging into a radially inwardly opening bead joined across a juncture shoulder to an axially extending flange, a cover mounting member including a generally axially resilient body and a generally radially resilient cantilever arm joined to the body adjacent one end thereof by a radially facing fulcrum rib, the other free end of the body having a rib shaped to conform to the wheel body shoulder and seating thereagainst, the fulcrum rib seating against the wheel rim juncture shoulder within the rim bead to axially compress the body and hold the free end rib against the wheel body shoulder, the intermediate portion of the body being of generally ogee shape and including oppositely opening integral ribs, one of said ribs seating against the intermediate flange of the wheel rim upon axial compression of the body and seating of the free end rib and fulcrum rib on their respective shoulders, the cantilever arm being resiliently biased radially outwardly with respect to the fulcrum rib and seating against the wheel rim inwardly facing flange, a cover member including a peripheral reversely bent flange seating on a like shaped flange at the free end of the cantilever arm to mount the cover member on the wheel, and cooperating means on the peripheral flange of the cover member and on the cantilever arm adjacent the free end thereof holding the cover member against rotation relative to the cantilever arm.

2. The combination recited in claim 1 wherein the free end flange of the cantilever arm is joined to the cantilever arm across a radially opening bead, and the cooperating means include a plurality of axially extending reinforcing ribs traversing the radially opening bead of the cantilever arm and a plurality of fingers on the peripheral flange of the cover member straddling the reinforcing ribs.

References Cited
UNITED STATES PATENTS

| | | | |
|---|---|---|---|
| 2,133,142 | 10/1938 | Horn | 301—37 |
| 2,193,106 | 3/1940 | Lyon | 301—37 |
| 2,239,366 | 4/1941 | Lyon | 301—37 |
| 2,714,041 | 7/1955 | Lyon | 301—37 |
| 2,728,610 | 12/1955 | Buerger | 301—37 |
| 2,842,403 | 7/1958 | Lyon | 301—37 |

BENJAMIN HERSH, *Primary Examiner.*

R. J. JOHNSON, *Assistant Examiner.*